United States Patent
Mishima et al.

(10) Patent No.: US 12,451,731 B2
(45) Date of Patent: Oct. 21, 2025

(54) RESONANCE-TYPE POWER CONVERTER CIRCUIT PROVIDED WITH RESONANCE CIRCUIT INCLUDING LC RESONANCE CIRCUIT AND SWITCHING ELEMENT

(71) Applicants: OMRON Corporation, Kyoto (JP); NATIONAL UNIVERSITY CORPORATION CHIBA UNIVERSITY, Chiba (JP)

(72) Inventors: Taichi Mishima, Kyoto (JP); Shingo Nagaoka, Kyoto (JP); Takeshi Uematsu, Kyoto (JP); Hiroo Sekiya, Chiba (JP)

(73) Assignees: OMRON CORPORATION, Kyoto (JP); NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 151 days.

(21) Appl. No.: 18/289,778

(22) PCT Filed: Mar. 30, 2022

(86) PCT No.: PCT/JP2022/015939
§ 371 (c)(1),
(2) Date: Jun. 24, 2024

(87) PCT Pub. No.: WO2022/249751
PCT Pub. Date: Dec. 1, 2022

(65) Prior Publication Data
US 2024/0339866 A1 Oct. 10, 2024

(30) Foreign Application Priority Data
May 26, 2021 (JP) .................. 2021-088509

(51) Int. Cl.
*H02J 50/12* (2016.01)
*H02J 50/80* (2016.01)
*H02M 3/00* (2006.01)

(52) U.S. Cl.
CPC .............. *H02J 50/12* (2016.02); *H02J 50/80* (2016.02); *H02M 3/015* (2021.05)

(58) Field of Classification Search
CPC ........... H02J 50/12; H02J 50/80; H02M 3/015
(Continued)

(56) References Cited

U.S. PATENT DOCUMENTS

2004/0130915 A1* 7/2004 Baarman .................. H02J 3/14
 363/21.02
2004/0130916 A1* 7/2004 Baarman ................. H02J 50/12
 363/21.02
(Continued)

FOREIGN PATENT DOCUMENTS

JP 2010166693 A 7/2010
JP 2012110211 A 6/2012
(Continued)

OTHER PUBLICATIONS

Ahmadi, et al. "A Self-Tuned Class-E Power Oscillator"; IEEE Transactions On Power Electronics, vol. 34, No. 5; May 2019; 16 pages.
(Continued)

*Primary Examiner* — Alfonso Perez Borroto
(74) *Attorney, Agent, or Firm* — CANTOR COLBURN LLP

(57) ABSTRACT

A resonance-type power converter circuit includes: a resonance circuit including a first LC resonance circuit and a switching element, and outputting an output voltage or current to a load; a detector circuit detecting output information; an calculation controller searching for a maximum
(Continued)

point in a characteristic of the output information at an operating frequency based on the detected output information, and determining an operating frequency corresponding to the searched maximum point; and a signal generator generating a drive control signal having the determined operating frequency, and controlling the frequency based on the drive control signal. The resonance circuit has a characteristic of output information at the operating frequency having a load independent point not depending on the load and corresponding to the maximum point and feeds back a drive control signal including the output information to the switching element and drives it at the load independent point by frequency control.

9 Claims, 19 Drawing Sheets

(58) Field of Classification Search
USPC .......................................................... 307/104
See application file for complete search history.

(56) References Cited

U.S. PATENT DOCUMENTS

| 2012/0217819 A1* | 8/2012 | Yamakawa | ............ | H02J 50/70 |
| | | | | 307/104 |
| 2017/0126065 A1* | 5/2017 | Park | ........................ | H02J 50/12 |
| 2019/0366866 A1* | 12/2019 | Cha | ........................ | H02M 7/217 |
| 2021/0013742 A1 | 1/2021 | Nakao et al. | | |
| 2021/0135495 A1 | 5/2021 | Nakao et al. | | |

FOREIGN PATENT DOCUMENTS

| JP | 3186447 U | 9/2013 |
| JP | 2018196318 A | 12/2018 |
| JP | 2019502342 A | 1/2019 |
| JP | 2019154196 A | 9/2019 |
| WO | 2020203689 A1 | 10/2020 |
| WO | 2021024362 A1 | 2/2021 |

OTHER PUBLICATIONS

International Search Report for International Application No. PCT/JP2022/015939; Date of Mailing, Jun. 21, 2022.
PCT Written Opinion of the International Searching Authority for International Application No. PCT/JP2022/015939; Date of Mailing, Jun. 21, 2022.
EPO Extended European Search Report for corresponding EP Application No. 22812025.0; issued May 19, 2025.
Zhicong, Huang et al. "Comparison of Basic Inductive Power Transfer Systems with Linear Control Achieving Optimized Efficient", IEEE Transactions on Power Electronics; USE, vol. 35, No. 3, Mar. 1, 2020.
Zhicong, Huang et al., "Control Design for Optimizing Efficiency in Inductive Power Transfer Systems", IEEE Transactions on Power Electronics, USA, vol. 33, No. 5, May 1, 2018.
JPO Notice of Reasons for Refusal for corresponding JP Application No. 2021-088509; Issued Oct. 22, 2024.

* cited by examiner

RESONANCE-TYPE POWER CONVERTER CIRCUIT PROVIDED WITH RESONANCE CIRCUIT INCLUDING LC RESONANCE CIRCUIT AND SWITCHING ELEMENT

CROSS REFERENCE TO RELATED APPLICATIONS

This is the U.S. national stage of application No. PCT/JP2022/015939, filed on Mar. 30, 2022. Priority under 35 U.S.C. § 119 (a) and 35 U.S.C. § 365 (b) is claimed from Japanese Application No. 2021-088509, filed May 26, 2021, the disclosure of which is also incorporated herein by reference.

TECHNICAL FIELD

The present invention relates to a resonance-type power converter circuit and a non-contact power transfer system using the resonance-type power converter circuit.

BACKGROUND ART

Conventionally, a moving body such as an automatic guided vehicle (AGV) is mounted with a rechargeable battery such as a lithium ion battery. When the rechargeable battery is charged, after the AGV is moved to a charging station, a power receiving coil mounted on the AGV is electromagnetically coupled to a power transmitting coil of a charging station to perform non-contact charging in a non-contact charging system.

In the non-contact power transfer system of FIG. 12 which is an example of the non-contact charging system, an AC power supply 31 having a voltage v11 is connected to a series resonance circuit of an inductor L11 of a primary coil of a transformer TR11, a resistor R11, and a capacitor C11. In addition, a load resistor RL is connected to a series resonance circuit of an inductor L12 of a secondary coil of the transformer TR11, a resistor R12, and a capacitor C12. In this case, the inductors L11 and L12 of the transformer TR11 are electromagnetically coupled to each other with a coupling degree K. When a current i11 flows from the AC power supply 31, a voltage v12 is applied to the load resistor RL, and a current i12 flows.

PRIOR ART DOCUMENT

Non-Patent Document

Non-patent Document 1: Mohammad Mahdi Ahmadi, et al., "A Self-Tuned Class-E Power Oscillator," IEEE TRANSACTIONS ON POWER ELECTRONICS, VOL. 34, NO. 5, May 2019.

SUMMARY OF THE INVENTION

Problems to be Solved by the Invention

However, the non-contact power transfer system of FIG. 12, which is an example of the non-contact charging system, has the following two problems as illustrated in FIG. 13.
Problem 1
When the positional relationship between the power transmission coil and the power receiving coil changes, the inductance changes, a resonance frequency fr changes, and switching frequencies fsw and fr do not match, which adversely affects the efficiency and the like. As a result, in order to make the switching frequency match the resonance frequency, a mechanism for controlling a drive circuit of a switching element is required. In addition, since output characteristics such as the output voltage and the output current of a charging circuit change due to a change in inductance, circuit design and control for satisfying a charging profile of the rechargeable battery become complicated.
Problem 2
A load fluctuates depending on a remaining amount of the rechargeable battery, and as a result, output characteristics such as the output voltage and the output current of the charging circuit fluctuate. This complicates circuit design and control for satisfying the charging profile of the rechargeable battery.

Therefore, complicated control for solving the two problems and addition of a mechanism associated with the control are required, and there are problematic points of a decrease in power conversion efficiency and an increase in volume, weight, and cost.

In order to solve these two problems, a class E resonance-type inverter circuit of FIG. 14 disclosed in Non-patent Document 1 has been proposed. However, in order to solve the problem 2, it is necessary to invert the phase of 180 degrees and to have load independency. However, in order to invert the phase, phase control is necessary. However, there is a problematic point that calculation cost of a calculation controller that performs the phase control becomes large.

An object of the present invention is to provide a resonance-type power converter circuit capable of solving the above problematic points, solving the above two problems, and significantly reducing the calculation cost as compared with the prior art, and a non-contact power transfer system using the resonance-type power converter circuit.

Solution to Problem

According to one aspect of the present invention, a resonance-type power converter circuit includes a resonance circuit, a detector circuit, a calculation controller, and a signal generator. The resonance circuit includes a first LC resonance circuit and a switching element, the resonance circuit outputting an output voltage or an output current to a load. The detector circuit is configured to detect output information which is information on the output voltage or the output current. The calculation controller is configured to search for a maximum point or a desired voltage in a characteristic of the output information at an operating frequency using a predetermined maximum point search method based on the detected output information and determine an operating frequency corresponding to the searched maximum point or desired voltage. The signal generator is configured to generate a drive control signal having the determined operating frequency and control the operating frequency on the switching element based on the drive control signal. The resonance circuit has a characteristic of output information at the operating frequency having a load independent point that does not depend on the load and corresponds to the maximum point or the desired voltage. The resonance circuit is configured to feed back a drive control signal including the output information to the switching element and drive the switching element at the load independent point by controlling the operating frequency using the drive control signal.

Effects of the Invention

Therefore, with the above configuration, the present invention provides the resonance-type power converter circuit capable of solving the above two problems, and significantly reducing the calculation cost as compared with the prior art, and the non-contact power transfer system using the resonance-type power converter circuit.

DETAILED DESCRIPTION

Figure 1:
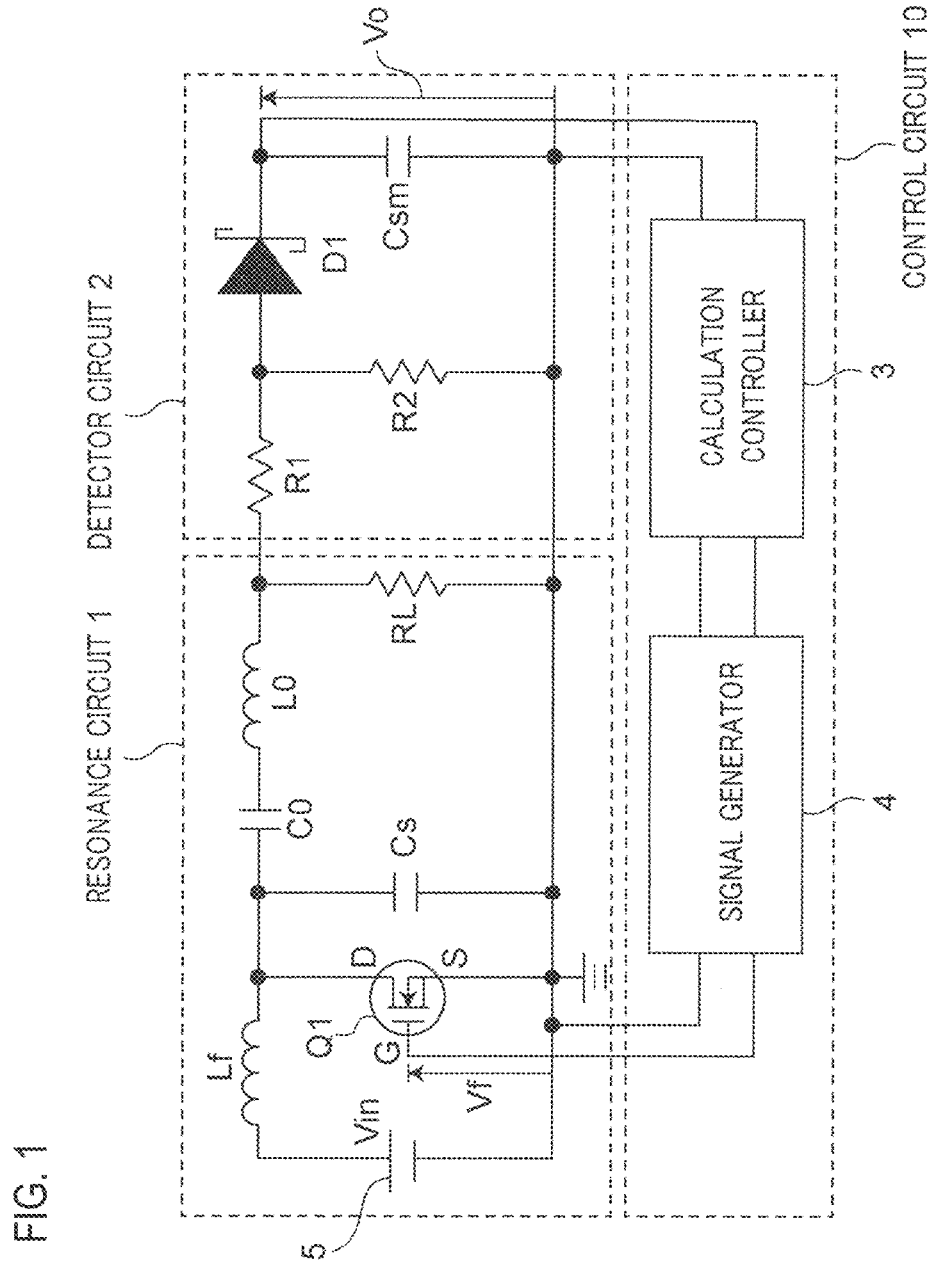
FIG. 1 is a circuit diagram illustrating a configuration example of a resonance-type power converter circuit according to an embodiment.

Hereinafter, an embodiment and modified embodiments according to the present invention will be described with reference to the drawings. It is noted that the same or similar components are denoted by the same reference numerals.

Findings of Inventors

Figure 14:
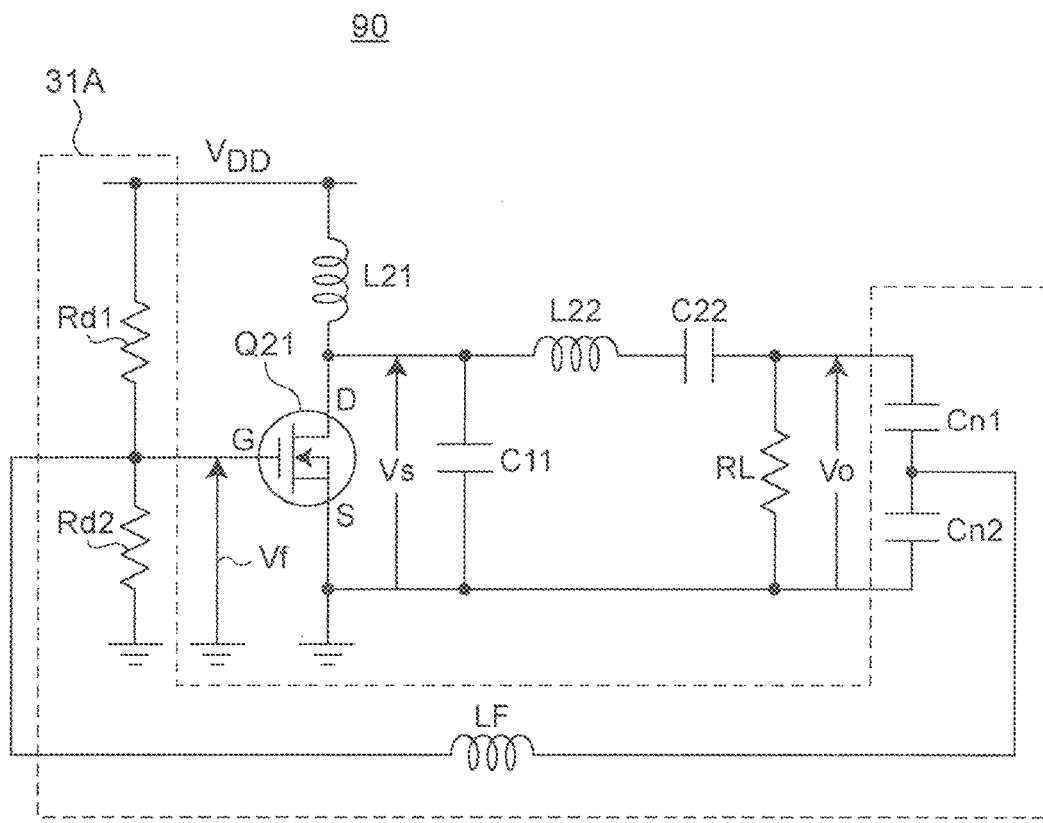
FIG. 14 is a circuit diagram illustrating a circuit example of a class E resonance-type inverter circuit according to the prior art.
Figure 15:
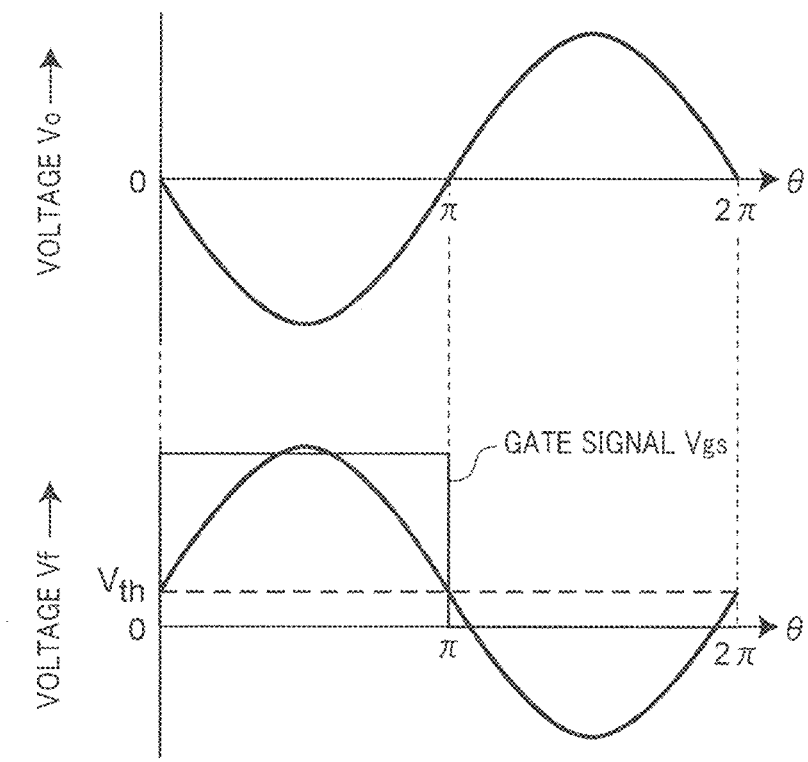
FIG. 15 is a waveform diagram illustrating an operation example of the class E resonance-type inverter circuit of FIG. 14.

FIG. 14 is a circuit diagram illustrating a circuit example of a class E resonance-type inverter circuit according to the prior art, and FIG. 15 is a waveform diagram illustrating an operation example of the class E resonance-type inverter circuit of FIG. 14.

Referring to FIG. 14, a class E resonance-type inverter circuit 90 includes a DC bias circuit 31A including voltage-dividing resistors Rd1 and Rd2, a feedback inductor LF, and voltage-dividing capacitors Cn1 and Cn2, a MOS field effect transistor (hereinafter, referred to as a MOS transistor) Q1, inductors L21 and L22, capacitors C21 and C22, and a load resistor RL.

In the class E resonance-type inverter circuit 90 of FIG. 14, a power supply voltage VDD is applied to the drain of the MOS transistor Q21 via the inductor L21, and the DC bias voltage divided by the voltage-dividing resistors Rd1 and Rd2 is applied to the gate of the MOS transistor Q21. An output voltage Vo across both ends of the load resistor Ro is divided by the voltage-dividing capacitors Cn1 and Cn2, and then applied as a gate signal to the gate of the MOS transistor Q1 via the feedback inductor LF. An output source voltage Vs generated by the MOS transistor Q1 is output to the load resistor RL as an output voltage Vo via the capacitors C1 and C2 and the inductor L2. In this case, as illustrated in FIG. 15, a gate voltage signal Vf applied to the gate of the MOS transistor Q1 becomes a voltage phase-shifted by 140 degrees with respect to the output voltage Vo.

In the class E resonance-type inverter circuit 90 according to Non-patent Document configured as described above, since the phase of the gate voltage signal Vf can be shifted by only 140 degrees with respect to the waveform of the output voltage Vo, the problem 2 cannot be solved. Therefore, there is a problematic point that control for coping with inductance and load fluctuation of the resonance circuit is required.

Therefore, in the embodiment according to the present invention, a resonance-type power converter circuit capable of solving both the problems 1 and 2 and a non-contact power transfer system using the resonance-type power converter circuit will be described below.

Embodiment

FIG. 1 is a circuit diagram illustrating a configuration example of a resonance-type power converter circuit according to an embodiment. Referring to FIG. 1, the resonance-type power converter circuit according to the embodiment includes a resonance circuit 1, a detector circuit 2, and a control circuit 10. In this case, the resonance-type power converter circuit is specifically a resonance-type inverter circuit. The control circuit 10 includes an calculation controller 3 and a signal generator 4. In this case, the resonance circuit 1 includes a DC power supply 5, a smoothing inductor Lf, a MOS transistor Q1 of switching element, capacitors Cs and C0, and an inductor L0 to configure an LC resonance circuit.

In the resonance-type power converter circuit of FIG. 1, an input voltage Vin from the DC power supply 5 is applied to the connection point between the drain and the source of the MOS transistor Q1 operating as a switching element and the resonance capacitor Cs via the smoothing inductor Lf. A gate voltage signal Vf (drive control signal) for driving and controlling the switching element Q1 from the signal generator 4 is applied to the gate of the MOS transistor Q1, and the MOS transistor Q1 is turned on or off by switching control based on the gate voltage signal Vf.

Further, in the resonance circuit 1, the resonance capacitors Cs and C0 correspond to transmission-side resonance capacitors in the non-contact power transfer system. In addition, the resonance inductor L0 corresponds to a self-inductance of a transformer (power transmission coil) in the non-contact power transfer system.

The detector circuit 2 detects a voltage of a load resistor RL, converts the voltage into a DC voltage, and outputs the DC voltage to the calculation controller 3. In the detector circuit 2, the voltage of the load resistor RL is divided by voltage-dividing resistors R1 and R2, and the divided voltage is rectified by a rectifying diode D1, and then smoothed by a smoothing capacitor Csm, so that an output voltage Vo is obtained and output to the calculation controller 3.

Figure 5:
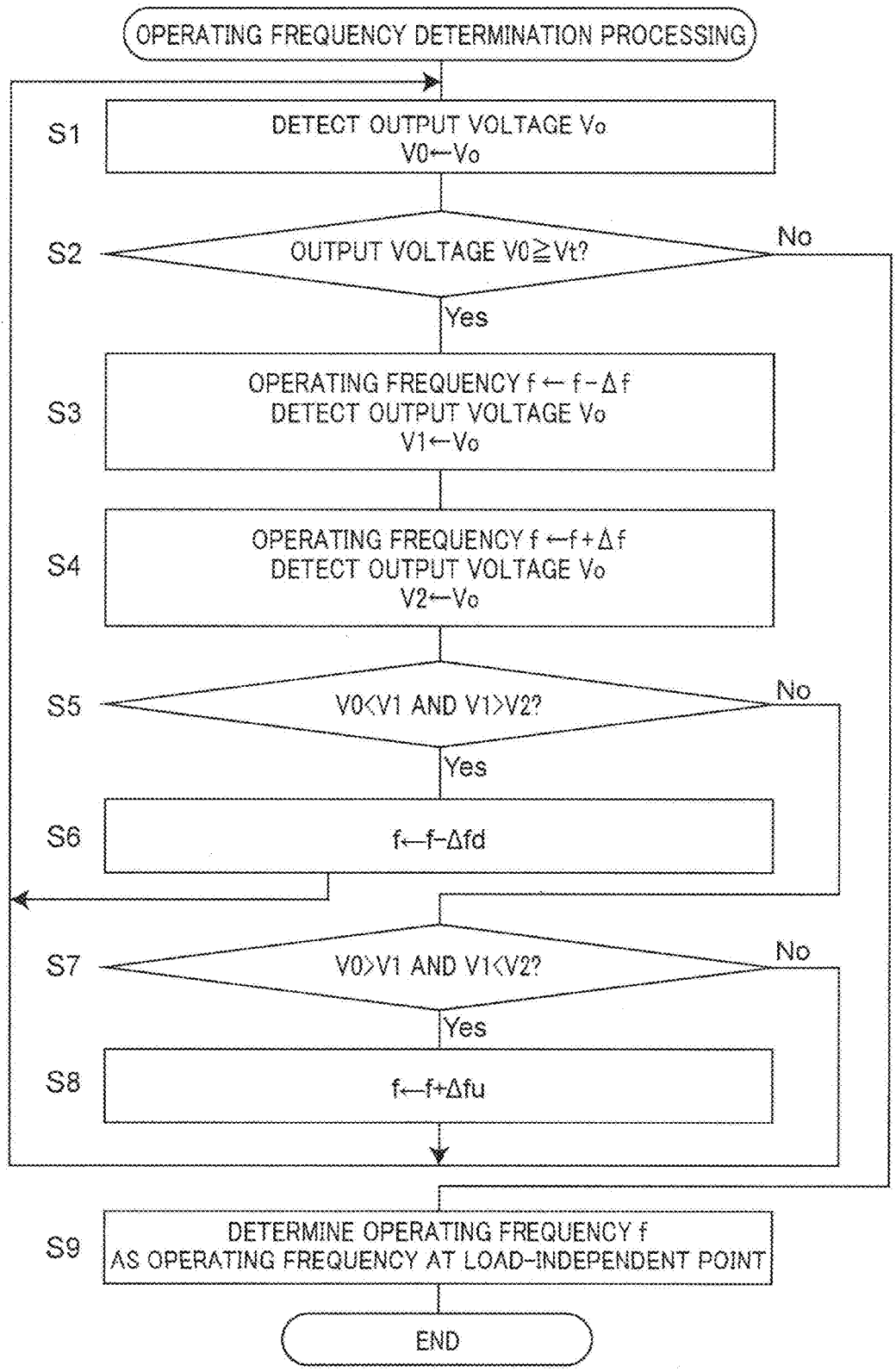
FIG. 5 is a flowchart illustrating operating frequency determination processing executed by a control circuit 10 of FIG. 1.
Figure 7:
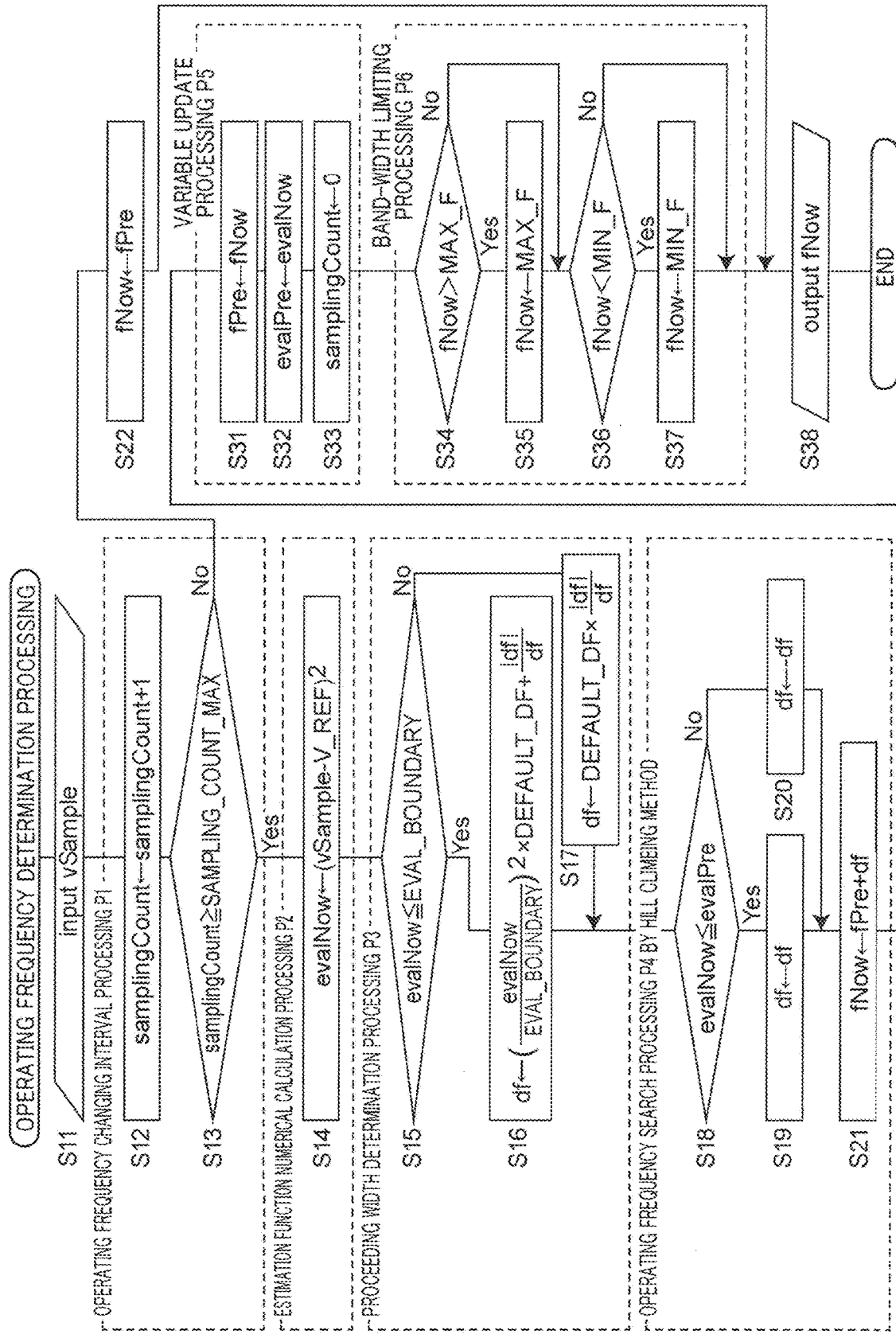
FIG. 7 is a flowchart illustrating detailed operating frequency determination processing executed by a control circuit 10 of FIG. 1.

Based on the detected output voltage Vo, the calculation controller 3 executes operating frequency determination processing of FIG. 5 or FIG. 7 using a maximum value search method such as a hill climbing method to search for the maximum value of the output voltage Vo in the characteristic of the output voltage Vo at the operating frequency, determines the operating frequency corresponding to the maximum value of the searched output voltage Vo, and outputs the operating frequency to the signal generator 4. The signal generator 4 generates a pulse width modulation (PWM) signal having an input operating frequency and applies the PWM signal as a gate voltage signal Vf to the gate of the MOS transistor Q1 and controls the frequency of the resonance circuit 1 including the MOS transistor Q1 and the LC resonance circuit.

Figure 2:
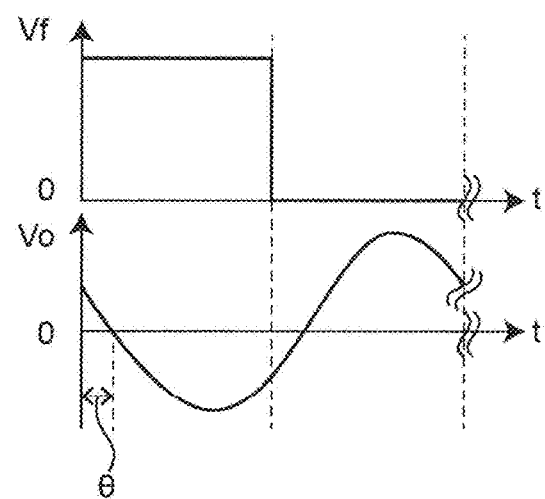
FIG. 2 is a waveform diagram illustrating a relationship between a gate voltage signal Vf and an output voltage V0 applied to a MOS transistor Q1 of FIG. 1 and a phase difference θ thereof.

FIG. 2 is a waveform diagram illustrating a relationship between the gate voltage signal Vf and an output voltage V0 applied to the MOS transistor Q1 of FIG. 1 and a phase difference $\theta$ thereof. As is apparent from FIG. 2, when the phase difference $\theta$ exists between the gate voltage signal Vf and the output voltage V0, the output voltage Vo is separated from the maximum value of the output voltage Vo.

Figure 3A:
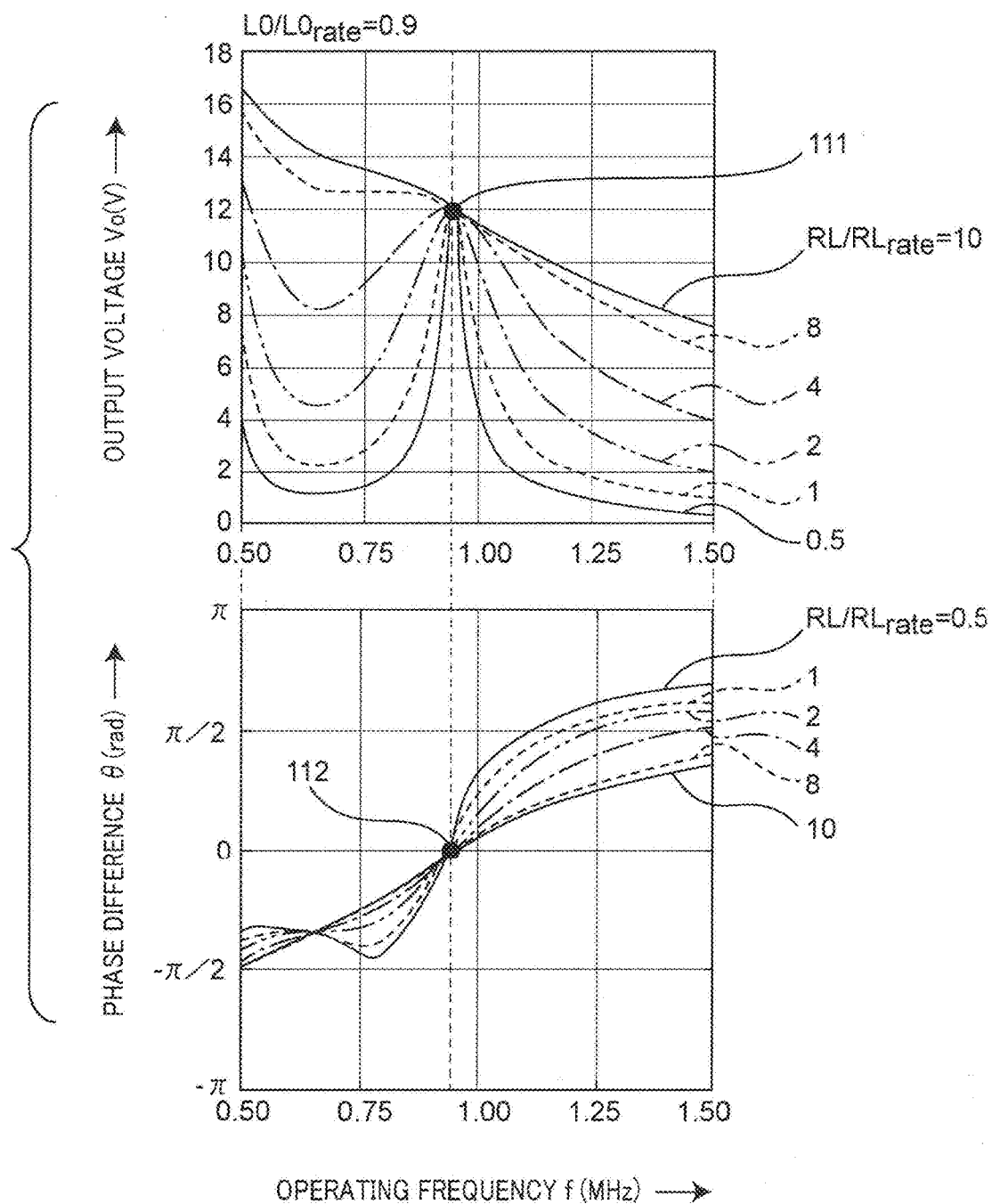
FIG. 3A is a simulation result of the resonance-type power converter circuit of FIG. 1 and is a graph illustrating an output voltage Vo and a phase difference θ at an operating frequency f when a parameter $L0/L0_{rate}=0.9$.
Figure 3B:
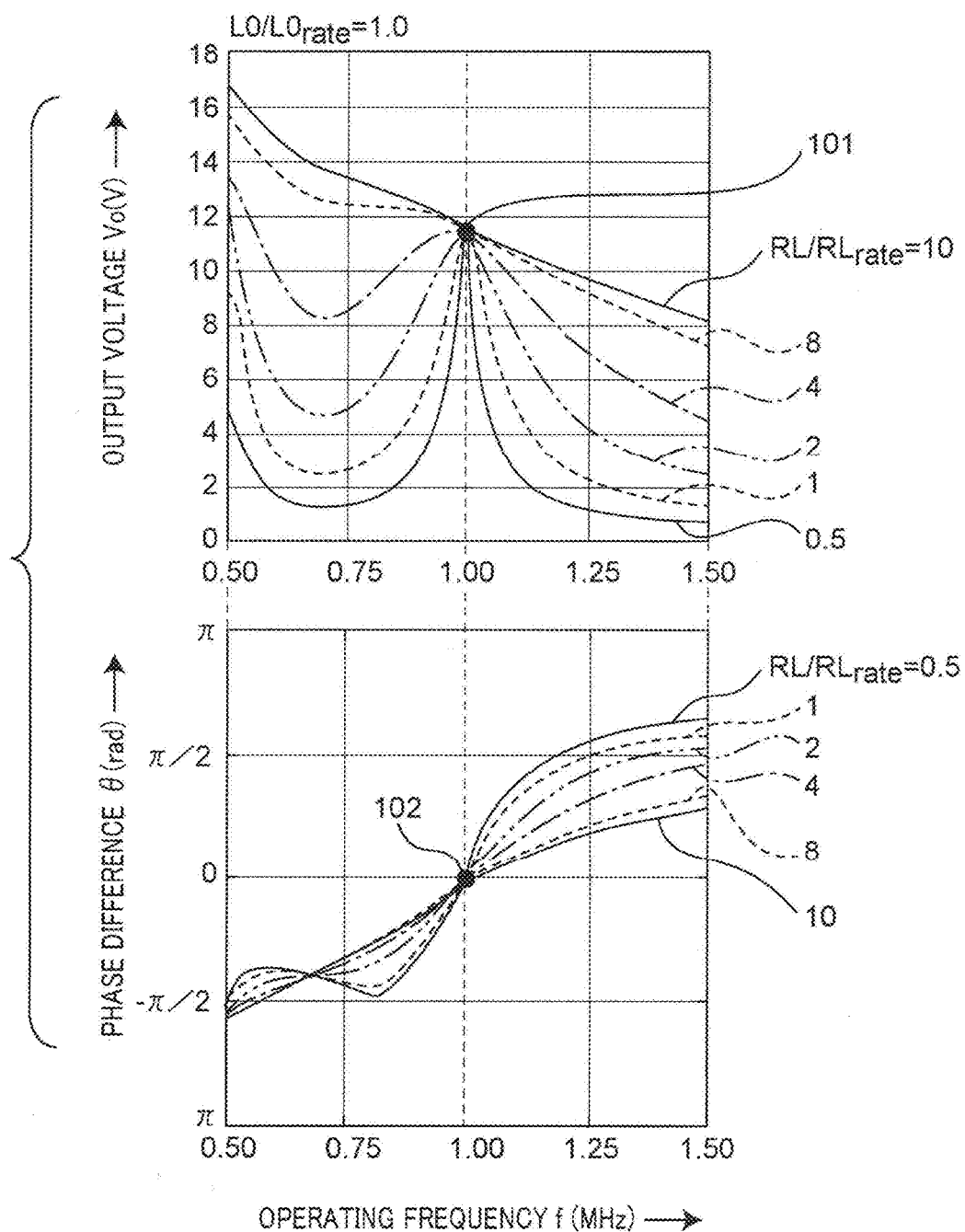
FIG. 3B is a simulation result of the resonance-type power converter circuit of FIG. 1 and is a graph illustrating the output voltage Vo and the phase difference θ at the operating frequency f when the parameter $L0/L0_{rate}=1.0$.
Figure 3C:
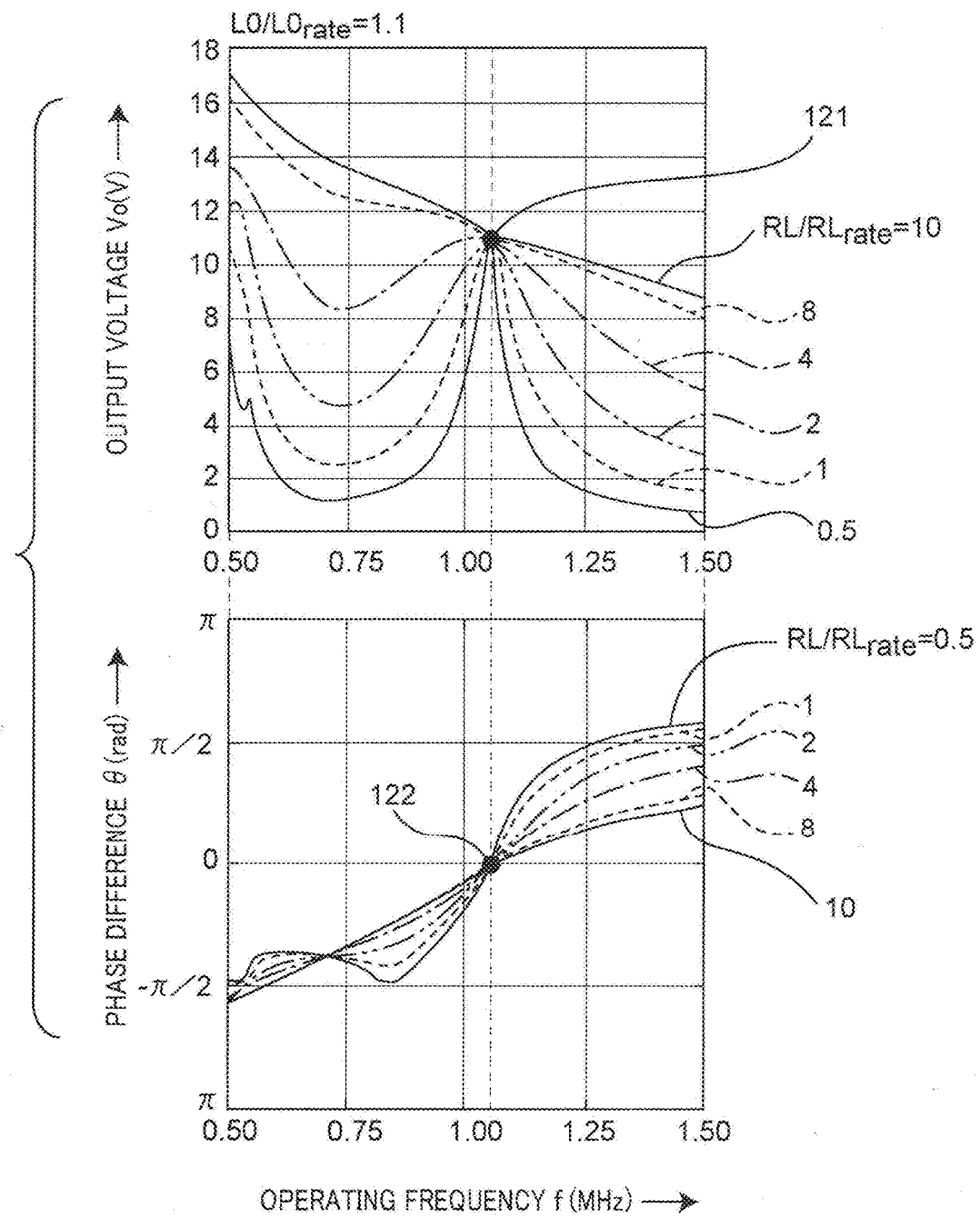
FIG. 3C is a simulation result of the resonance-type power converter circuit of FIG. 1 and is a graph illustrating the output voltage Vo and the phase difference θ at the operating frequency f when the parameter $L0/L0_{rate}=1.1$.

FIG. 3A is a simulation result of the resonance-type power converter circuit of FIG. 1 and is a graph illustrating the output voltage Vo and the phase difference $\theta$ at the operating frequency f when a parameter $L0/L0_{rate}$=0.9. Further, FIG. 3B is a simulation result of the resonance-type power converter circuit of FIG. 1 and is a graph illustrating the output voltage Vo and the phase difference $\theta$ at the operating frequency f when the parameter $L0/L0_{rate}$=1.0. Further, FIG. 3C is a simulation result of the resonance-type power converter circuit of FIG. 1 and is a graph illustrating the output voltage Vo and the phase difference $\theta$ at an operating frequency f when the parameter $L0/L0_{rate}$=1.1. In FIG. 3A and subsequent drawings, $Lo_{rate}$ is a reference element value (inductance value) of the resonance inductor L0, and $RL_{rate}$ is a reference element value (resistance value) of the load resistor RL.

In this case, FIGS. 3A to 3C illustrate that the load independent point fluctuates when the inductance ratio $L0/L0_{rate}$ changes.

As is apparent from FIG. 3B, the output voltage Vo at the operating frequency has a maximum point which is a load independent point 101. In this case, the phase difference $\theta$ is 0 degree (reference numeral 102), and load independency and the zero volt switching (ZVS) can be achieved.

As illustrated in FIG. 3A, due to the change in the inductance L0, the output voltage Vo changes from the load independent point 101 to 111, the phase difference $\theta$ becomes 0 degree (reference numeral 112), and control is performed at the corresponding operating frequency. In addition, as illustrated in FIG. 3C, due to the change in the inductance L0, the output voltage Vo changes from the load independent point 101 to 121, the phase difference $\theta$ becomes 0 degree (reference numeral 122), and control is performed at the corresponding operating frequency.

Figure 4:
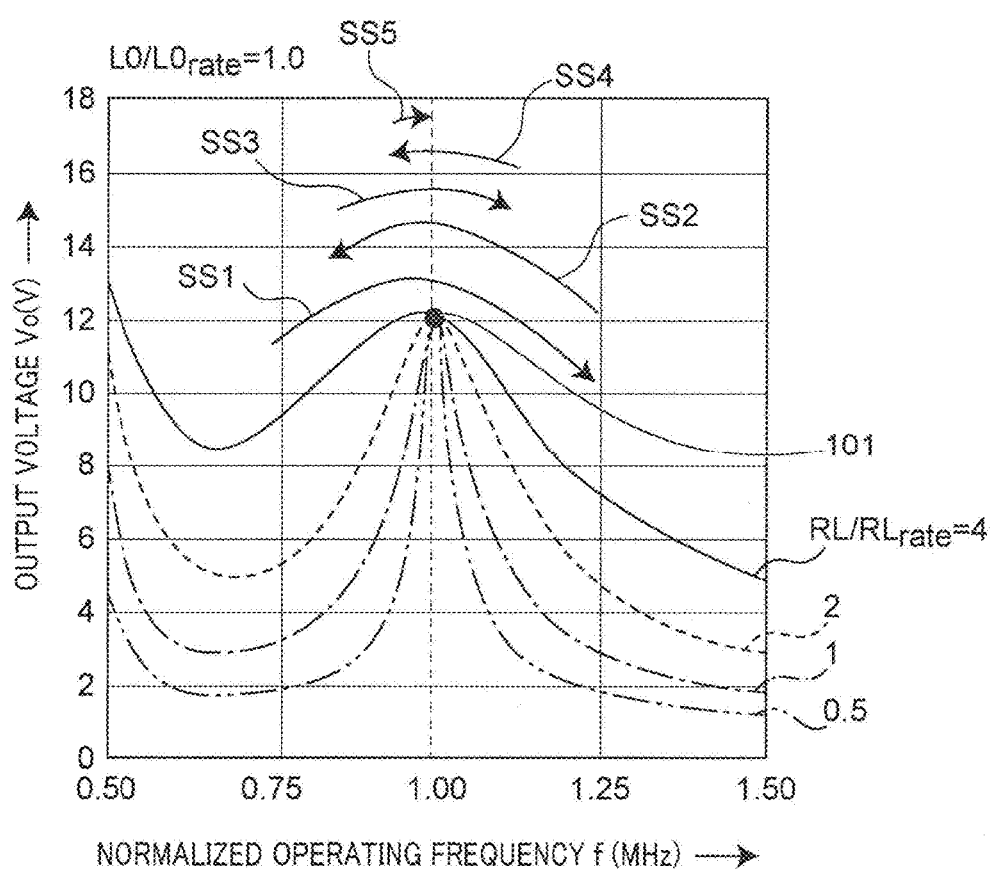
FIG. 4 is a graph illustrating a control example when frequency control is performed by a hill climbing method in the resonance-type power converter circuit of FIG. 1 in the graph of FIG. 3B.

FIG. 4 is a graph illustrating a control example when frequency control is performed by a hill climbing method in the resonance-type power converter circuit of FIG. 1 in the graph of FIG. 3B. As is apparent from FIG. 4, when the frequency control is performed by the hill climbing method when the maximum point of the output voltage curve or the desired voltage has the load independent point 101, as indicated by SS1 to SS5, the frequency is changed in one direction from the preset frequency, it is detected that the voltage gradient is inverted, the direction of the frequency change is inverted, and this is repeated, and the maximum point of the voltage or the desired voltage can be searched for. It is noted that the latter case of "searching for the desired voltage" is as follows. When the load fluctuation range is widened and the load becomes a light load (large load resistor), the maximum point is not obtained as in $L0/L0_{rate}$=8, 10 in FIGS. 3A to 3C. Therefore, instead of the maximum point, the control target value may be controlled without depending on the change in the graph due to the load fluctuation so that the output voltage value (as a result, the setting of the resonance circuit at which this point is the maximum point or the vicinity thereof) becomes a desired voltage.

FIG. 5 is a flowchart illustrating operating frequency determination processing executed by the control circuit 10 of FIG. 1.

In step S1 of FIG. 5, the output voltage Vo of the resonance circuit 1 is detected and set as the output voltage V0. Next, in step S2, it is determined whether or not the output voltage V0≥Vt, and the processing flow proceeds to step S3 when YES, and proceeds to step S9 when NO. In step S3, the operating frequency f is lowered by a predetermined shift frequency Δf, that is, (f−Δf) is substituted for the operating frequency f, the output voltage Vo of the resonance circuit 1 is detected, and the output voltage Vo is substituted for a voltage V1. In addition, in step S4, the operating frequency f is heightened by a predetermined shift frequency Δf (to be returned to the original operating frequency), that is, (f+Δf) is substituted for the operating frequency f, the output voltage Vo of the resonance circuit 1 is detected, and the output voltage Vo is substituted for a voltage V2.

Next, in step S5, it is determined whether or not V0<V1 and V1>V2, and the processing flow proceeds to step S6 when YES, and proceeds to step S7 when NO. In step S6, the operating frequency f is lowered by a predetermined shift frequency Δfd, that is, (f−Δfd) is substituted for the operating frequency f, and the processing returns to step S1. On the other hand, in step S7, it is determined whether or not V0>V1 and V1<V2, and the processing flow proceeds to step S8 when YES, and proceeds to step S1 when NO. In step S8, the operating frequency f is heightened by a predetermined shift frequency Δfu, that is, (f+Δfu) is substituted for the operating frequency f, and the processing returns to step S1. Further, in step S9, the operating frequency f is determined as the operating frequency of the load independent point, and the operating frequency determination processing is ended.

Figure 8:
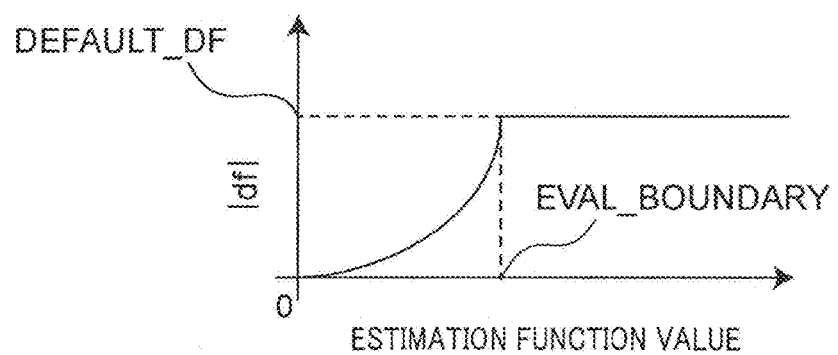
FIG. 8 is a graph for setting a traveling width df in traveling width determination processing P3 in the operating frequency determination processing of FIG. 7.

Further, in the operating frequency determination processing of FIG. 7, the shift frequencies Δf, Δfu, and Δfd correspond to a traveling width df of FIG. 8.

Figure 6:
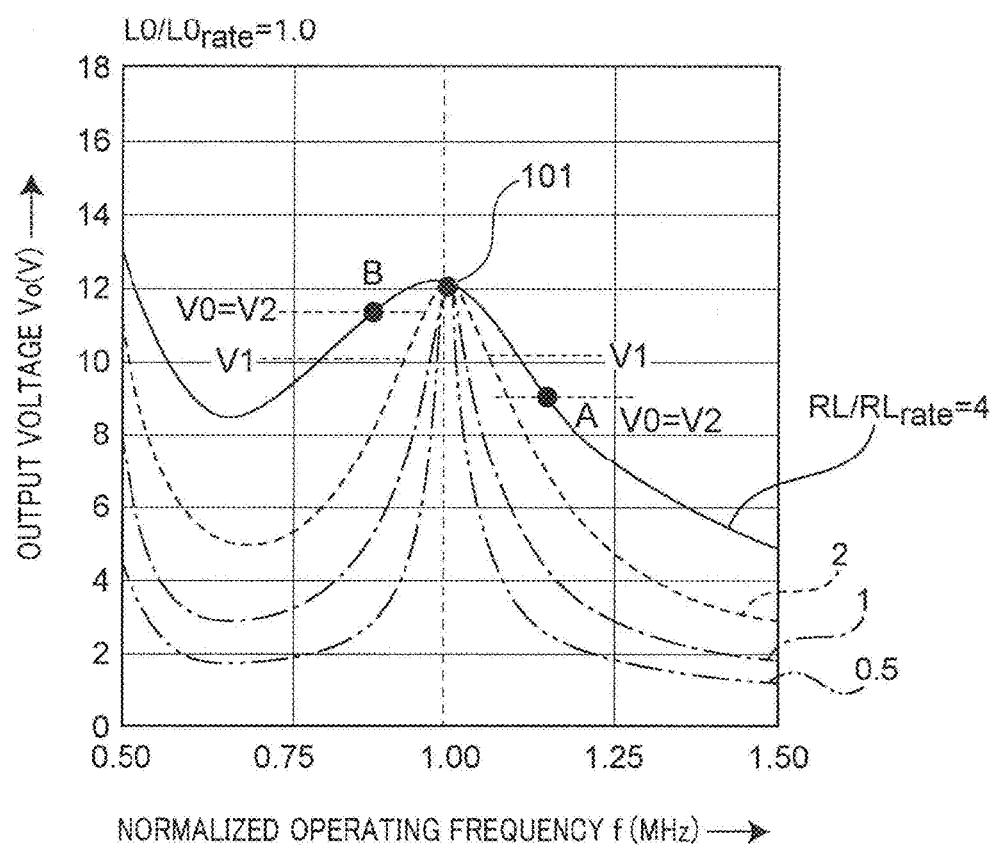
FIG. 6 is a graph illustrating a control example in a graph of the output voltage Vo at the operating frequency f when the operating frequency is determined by the operating frequency determination processing of FIG. 5.

FIG. 6 is a graph illustrating a control example in a graph of the output voltage Vo at the operating frequency f when the operating frequency is determined by the operating frequency determination processing of FIG. 5. As is apparent from FIG. 6, in the characteristic of the output voltage Vo at the operating frequency, it can be seen that the output voltage Vo reaches the load independent point 101 from an operating point A through an operating point B.

FIG. 7 is a flowchart illustrating detailed operating frequency determination processing executed by the control circuit 10 of FIG. 1. When the operating frequency determination processing of FIG. 7 is executed, the following initialization processing is first executed. It is noted that each numerical value is an example.

Initialization Processing

Boundary value of evaluation function value: EVAL_BOUNDARY←0.025
Default value of traveling width: DEFAULT_DF←9.0×$10^3$
Default value of operating frequency: DEFAULT_F←0.943×$10^6$
Maximum value of sampling count value: SAMPLING_COUNT_MAX←2000
Maximum operating frequency: MAX_F←1.2×$10^6$
Minimum operating frequency: MIN_F←0.8×$10^6$
Target voltage: V_REF←1.44
Current value of evaluation function value: evalNow←0
Preset value of evaluation function value: evalPre←1.0×$10^{10}$
Traveling width: dF←DEFAULT_DF
Current value of operating frequency: fNOW←DEFAULT_F
Preset value of operating frequency: fPre←DEFAULT_F
Sampling count value: samplingCount←0

In step S11 of FIG. 7, after a sample value vSample of the output voltage Vo of the resonance circuit 1 is input, the operating frequency change interval processing P1 including steps S11 to S12 is executed.

The operating frequency change interval processing P1 is provided for changing the operating frequency for each number of times defined by the maximum value SAMPLING_COUNT_MAX of the sampling count value. In step S12, a sampling count value samplingCount is incremented by 1. In step S13, it is determined whether or not samplingCount≥SAMPLING_COUNT_MAX, and the processing flow proceeds to step S14 when YES, and proceeds to step S22 when NO. It is noted that, in step S22, a preset value fPre of the operating frequency is substituted as a current value fNow of the operating frequency, and the processing flow proceeds to step S38.

Next, in step S14, the evaluation function value calculation processing P2 for calculating an evaluation function value evalNow is executed such that the closer the sample value vSample of the detected output voltage Vo is to the target voltage V_REF, the smaller the evaluation function value becomes. Specifically, for example, the current value evalNow of the evaluation function value is calculated using the following equation.

$$evalNow = (vSample - \text{V\_REF})^2$$

Next, the traveling width determination processing P3 including steps S15 to S17 is executed.

FIG. 8 is a graph for setting the traveling width df in the traveling width determination processing P3 of FIG. 7. As illustrated in FIG. 8, when the evaluation function value becomes smaller than the boundary value EVAL_BOUNDARY which is a constant reference value, the traveling width df is set so as to reduce an absolute value |df| of the traveling width df. In step S15, it is determined whether or not evalNow≤EVAL_BOUNDARY, and the processing flow proceeds to step S16 when YES, and proceeds to step S17 when NO. In step S16, the traveling width df is calculated using, for example, the following equation, and then, the processing flow proceeds to step S13.

$$df \leftarrow \left(\frac{evalNow}{\text{EVAL\_BOUNDARY}}\right)^2 \times \text{DEFAULT\_DF} + \frac{|df|}{df}. \qquad (1)$$

On the other hand, in step S17, the traveling width df is calculated using, for example, the following equation, and then the processing flow proceeds to step S13.

$$df \leftarrow \text{DEFAULT\_DF} + \frac{|df|}{df}. \qquad (2)$$

Next, operating frequency search processing P4 by the hill climbing method including steps S18 to S21 is executed. In the operating frequency search processing P4, if the current evaluation is better than the previous evaluation, the processing flow proceeds in the same direction, and if the current evaluation is worse, the processing changes the traveling direction. In step S18, it is determined whether or not evalNow≤evalPre, and the processing flow proceeds to step S19 when YES, and proceeds to step S20 when NO. In step S19, the traveling width df is substituted for the traveling width df, and then the processing flow proceeds to step S21. On the other hand, in step S20, −df obtained by adding a minus sign to the traveling width df is substituted for the traveling width df, and then the processing flow proceeds to step S21. In step S21, the preset value fPre of the operating frequency and the traveling width df are added to set the addition result as the current value fNow of the operating frequency, and the processing flow proceeds to step S31.

Next, the variable change processing P5 including steps S31 to S33 is executed. In step S31, the current value fNow of the operating frequency is set as the preset value fPre of the operating frequency, and in step S32, the current value evalNow of the evaluation function value is set as the preset value evalPre of the evaluation function value. Next, in step S33, the sampling count value samplingCount is reset to 0, and the processing flow proceeds to step S34.

Next, the bandwidth limitation processing P6 including steps S34 to S37 is executed. In step S34, it is determined whether or not fNow>MAX_F, and the processing flow proceeds to step S35 when YES, and proceeds to step S36 when NO. In step S35, the maximum operating frequency MAX_F is set as the current value fNow of the operating frequency, and the processing flow proceeds to step S36. In step S36, it is determined whether or not fNow<MAX_F, and the processing flow proceeds to step S37 when YES, and proceeds to step S38 when NO. In step S37, the minimum operating frequency MIN_F is set as the current value fNow of the operating frequency, and the processing flow proceeds to step S38.

In step S38, it is determined that the operating frequency has been determined, the current value fNow of the operating frequency is output as the operating frequency, and the operating frequency determination processing is ended.

As described above, the resonance-type power converter circuit according to the present embodiment is a resonance-type power converter circuit including the resonance circuit 1 including the LC resonance circuit and the switching element Q1. The output voltage of the resonance circuit 1 is output to the load RL, the operating frequency of the resonance-type power converter circuit is determined based on the output voltage, and the switching element Q1 is controlled to be turned on and off using the gate voltage signal Vf (drive control signal) so as to operate the resonance-type power converter circuit at the determined operating frequency. In this case, the operating frequency held by the resonance circuit 1 at the maximum value at which the output voltage becomes the maximum is determined. Therefore, even if the inductance or capacitance of the resonance circuit 1 changes, the resonance circuit 1 can hold the operating frequency so as to hold the maximum value at which the output voltage becomes the maximum, and thus, it is possible to hold the phase state and realize the load-independent characteristic independent of the load and the zero volt switching (ZVS) in the resonance circuit 1. Accordingly, the above-described problems 1 and 2 can be solved.

Application Examples

Figure 9:
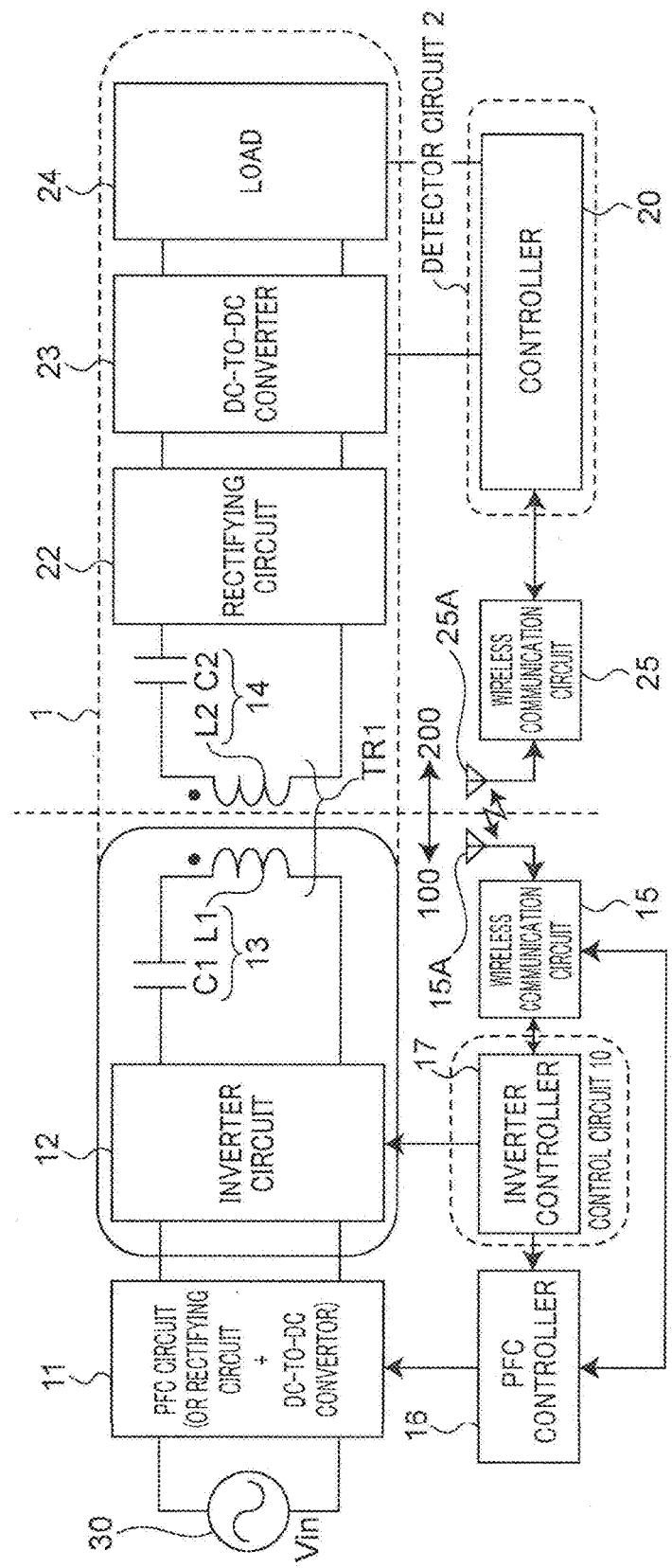
FIG. 9 is a block diagram illustrating a configuration example of a non-contact power transfer system when the resonance-type power converter circuit of FIG. 1 is applied to the non-contact power transfer system.

FIG. 9 is a block diagram illustrating a configuration example of a non-contact power transfer system when the resonance-type power converter circuit of FIG. 1 is applied to the non-contact power transfer system. Referring to FIG. 9, components 12 to 24 correspond to the resonance circuit 1 of FIG. 1, the component 20 corresponds to the detector circuit 2 of FIG. 1, and the component 17 corresponds to the control circuit 10 of FIG. 1.

Referring to FIG. 9, the non-contact power transfer system includes a power transmission apparatus 100 and a power receiving apparatus 200. In this case, the power transmission apparatus 100 includes a power factor correction circuit (hereinafter, referred to as PFC circuit) 11, PFC controller 16 that controls the operation of PFC circuit 11, an inverter circuit 12, a power transmission LC resonance circuit 13, an inverter controller 17, and a wireless communication circuit 15 having an antenna 15A. On the other hand, the power receiving apparatus 200 includes a power receiving LC resonance circuit 14, a rectifying circuit 22, a DC-to-DC converter 23, a load 24, a controller 20 that detects a voltage and a current of the load 24 and controls the DC-to-DC converter 23, and a wireless communication circuit 25 having an antenna 25A. In this case, PFC circuit 11 improves the power factor by shaping the waveform of the input current based on a predetermined AC voltage. Further, the inverter circuit 12 converts an input predetermined DC voltage into an AC voltage.

In this case, the power transmission apparatus 100 and the power receiving apparatus 200 are located close to each other for power supply such as charging, for example. Accordingly, the power transmission LC resonance circuit 13 and the power receiving LC resonance circuit 14 are electromagnetically coupled to each other, for example, to form a transformer TRI. In addition, the wireless communication circuit 15 and the wireless communication circuit 25 transmit and receive necessary information data by performing wireless communication using the antennas 15A and 25A, respectively.

It is noted that PFC circuit 11 may be a cascade connection circuit of a rectifying circuit and a DC-to-DC converter. The DC-to-DC converter converts an input DC voltage into a predetermined DC voltage. In addition, PFC circuit 11 or the cascade connection circuit of the rectifying circuit and the DC-to-DC converter may be omitted. In this case, when PFC circuit 11 is omitted, PFC controller 16 can be deleted. Alternatively, when a cascade connection circuit of a rectifying circuit and a DC-to-DC converter is provided instead of PFC circuit 11, a voltage controller that controls the DC-to-DC converter is provided instead of PFC controller 16.

Further, at least one of the DC-to-DC converter on the power transmission side and the DC-to-DC converter 23 on the power receiving side may be omitted, but it is necessary to control the output voltage as follows.

In the non-contact power transfer system of FIG. 9, when a distance between inductors L1 and L2 as power transmitting and receiving coils changes, a coupling degree K changes. As a result, the resonance characteristic changes, and the output voltage changes. In this case, in order to make the output voltage constant, it is necessary to control the voltage in the DC-to-DC converters on the power transmission side and/or the power receiving side. In this case, in order to control the DC-to-DC converter on the power transmission side, it is necessary to transmit information of the output voltage detected by the controller 20 on the power receiving side to the voltage controller of the DC-to-DC converter on the power transmission side via the wireless communication circuits 25 and 15. On the other hand, the DC-to-DC converter 23 on the power receiving side is configured to be controlled by the controller 20 based on the information of the output voltage detected by the controller 20 on the power receiving side.

In the power transmission apparatus 100 of FIG. 1, PFC circuit 11 converts an input voltage Vin, which is an AC voltage from an AC power supply 30 such as a commercial AC power supply, into a DC voltage, performs the power factor improvement processing on the input voltage using a predetermined power factor improvement method under the control of PFC controller 16, and outputs the output voltage to the inverter circuit 12. The inverter circuit 12 switches the input DC voltage based on, for example, the PWM gate signal from the inverter controller 17 to convert the DC voltage into a predetermined AC voltage, and outputs the AC voltage to the rectifying circuit 22 via the power transmission LC resonance circuit 13 and the power receiving LC resonance circuit 14.

In this case, PFC controller 16 receives load information such as the output voltage and the output current to the load 24 from the controller 20 via the wireless communication circuits 25 and 15, and controls PFC circuit 11 to perform the power factor correction processing based on the load information. The power transmission LC resonance circuit 13 includes the inductor L1 and a capacitor C1 illustrated in FIG. 10A. The power transmission LC resonance circuit 13, for example, generates AC power including an AC voltage resonated at a predetermined resonance frequency fr based on the input voltage and having the resonance frequency fr, and transmits the generated AC power to the power receiving LC resonance circuit 14 coupled to the power transmission LC resonance circuit 13.

Figure 11A:
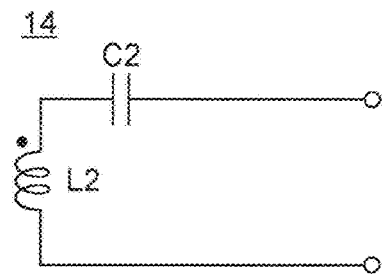
FIG. 11A is a circuit diagram illustrating a configuration example of an LC resonance circuit 14 of FIG. 9.

In the power receiving apparatus 200 of FIG. 1, the power receiving LC resonance circuit 14 is, for example, an LC resonance circuit including the inductor L2 and a capacitor C2 illustrated in FIG. 11A, receives the AC power from the power transmission LC resonance circuit 13, and outputs the AC voltage of the AC power to the rectifying circuit 22. The rectifying circuit 22 rectifies the input AC voltage into a DC voltage and outputs the DC voltage to the load 24. The controller 20 detects the output voltage and the output current to the load 24 and transmits load information including these pieces of information to PFC controller 16 via the wireless communication circuits 25 and 15. In addition, the inverter controller 17 also generates, for example, a predetermined gate voltage signal Vf based on the load information, and controls the inverter circuit 12, so that the inverter circuit 12 operates at a predetermined operating frequency.

It is noted that the rectifying circuit 22 may be, for example, a rectifying circuit such as a half-wave rectifying circuit, a double-wave rectifying circuit, a full-bridge rectifying circuit, a half-active rectifying circuit, a voltage doubler rectifying circuit, or a current doubler rectifying circuit.

As described above, according to the non-contact power transfer system according to the present embodiment, by using the resonance-type power converter circuit of FIG. 1, even if the inductance or capacitance of the resonance circuit 1 changes, the resonance circuit 1 can hold the operating frequency so as to hold the maximum value at which the output voltage becomes the maximum, and thus, it is possible to hold the phase state and realize the load-independent characteristic independent of the load and the zero volt switching (ZVS) in the resonance circuit 1. As a result, the power can be transmitted from the power transmission apparatus 100 to the power receiving apparatus 200 by solving the above-described problems 1 and 2.

In addition, as described above, by applying the resonance-type power converter circuit 1 according to the present embodiment to the partial circuits of the inverter circuit 12, the power transmission LC resonance circuit 13, and the power receiving LC resonance circuit 14, then the DC-to-DC converter 23 for controlling the output characteristic and the controller thereof can be reduced.

Hereinafter, the power transmission LC resonance circuit 13 is referred to as LC resonance circuit 13, and the power receiving LC resonance circuit 14 is referred to as LC resonance circuit 14.

Modified Embodiments and the Like

Modified embodiments and the like of the LC resonance circuits 13 and 14 will be described below. The following inductors include a self-inductance, an excitation inductance, a leakage inductance, or the like, and L31, L41, and L42 mean that inductors different from these inductors are provided. In addition, the following configuration example is merely a circuit of a basic form, and the number of inductors and capacitors connected in series or in parallel may be changed.

Figure 10A:
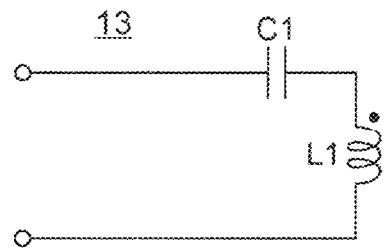
FIG. 10A is a circuit diagram illustrating a configuration example of an LC resonance circuit 13 of FIG. 9.

FIG. 10A is a circuit diagram illustrating a configuration example of the LC resonance circuit 13 of FIG. 9. Referring to FIG. 10A, the LC resonance circuit 13 includes a series circuit of the inductor L1 and the capacitor C1. In this case, the LC resonance circuit 13 of the power transmission apparatus 100 may be configured to include any one of the following LC resonance circuits 13A to 13E.

Figure 10B:
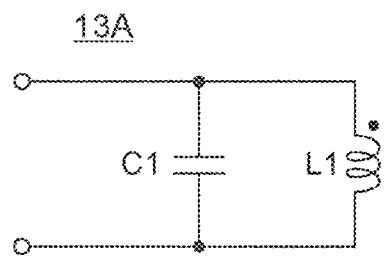
FIG. 10B is a circuit diagram illustrating a configuration example of an LC resonance circuit 13A according to a modified embodiment 1.
Figure 10C:
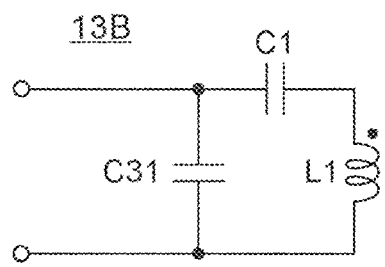
FIG. 10C is a circuit diagram illustrating a configuration example of an LC resonance circuit 13B according to a modified embodiment 2.

FIG. 10B is a circuit diagram illustrating a configuration example of the LC resonance circuit 13A according to a modified embodiment 1. Referring to FIG. 10B, the LC resonance circuit 13A includes a parallel circuit of the inductor L1 and the capacitor C1. FIG. 10C is a circuit diagram illustrating a configuration example of the LC resonance circuit 13B according to a modified embodiment 2. Referring to FIG. 10C, the LC resonance circuit 13B includes a parallel circuit of a capacitor C31, and a series circuit of the inductor L1 and the capacitor C1.

Figure 10D:
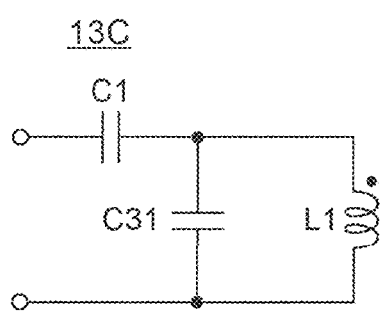
FIG. 10D is a circuit diagram illustrating a configuration example of an LC resonance circuit 13C according to a modified embodiment 3.

FIG. 10D is a circuit diagram illustrating a configuration example of the LC resonance circuit 13C according to a modified embodiment 3. Referring to FIG. 10D, the LC resonance circuit 13C includes a series circuit of the capacitor C1, and a parallel circuit of the inductor L1 and the capacitor C31.

Figure 10E:
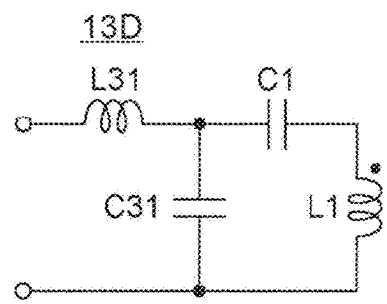
FIG. 10E is a circuit diagram illustrating a configuration example of an LC resonance circuit 13D according to a modified embodiment 4.

FIG. 10E is a circuit diagram illustrating a configuration example of the LC resonance circuit 13D according to a modified embodiment 4. Referring to FIG. 10E, the LC resonance circuit 13D includes an inductor L31 connected in series to a parallel circuit of the capacitor C31, and a series circuit of the inductor L1 and the capacitor C1.

Figure 10F:
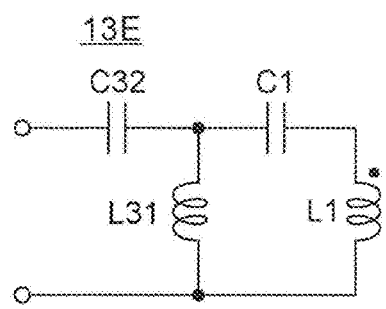
FIG. 10F is a circuit diagram illustrating a configuration example of an LC resonance circuit 13E according to a modified embodiment 5.

FIG. 10F is a circuit diagram illustrating a configuration example of the LC resonance circuit 13E according to a modified embodiment 5. Referring to FIG. 10F, the LC resonance circuit 13E includes a capacitor C32 connected in series to a parallel circuit of the inductor L31, and a series circuit of the inductor L1 and the capacitor C1.

As is apparent from FIGS. 10A to 10F, each of the LC resonance circuit 13, and 13A to 13E may include at least one inductor and at least one capacitor, and each inductor and each capacitor may be connected in series or in parallel.

In addition, the LC resonance circuit 14 of the power receiving apparatus 200 of FIG. 9 may be configured to include any one of the following LC resonance circuits 14A to 14E.

FIG. 11A is a circuit diagram illustrating a configuration example of the LC resonance circuit 14 of FIG. 9. Referring to FIG. 11A, the LC resonance circuit 14 includes a series circuit of the inductor L2 and the capacitor C2.

Figure 11B:
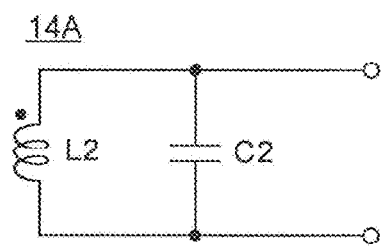
FIG. 11B is a circuit diagram illustrating a configuration example of an LC resonance circuit 14A according to a modified embodiment 6.

FIG. 11B is a circuit diagram illustrating a configuration example of the LC resonance circuit 14A according to a modified embodiment 6. Referring to FIG. 11B, the LC resonance circuit 14A includes a parallel circuit of the inductor L2 and the capacitor C2.

Figure 11C:
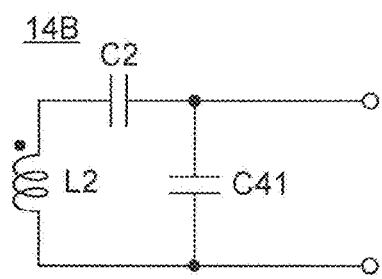
FIG. 11C is a circuit diagram illustrating a configuration example of an LC resonance circuit 14B according to a modified embodiment 7.

FIG. 11C is a circuit diagram illustrating a configuration example of the LC resonance circuit 14B according to a modified embodiment 7. Referring to FIG. 11C, the LC resonance circuit 14B includes a parallel circuit of a capacitor C41, and a series circuit of the inductor L2 and the capacitor C2.

Figure 11D:
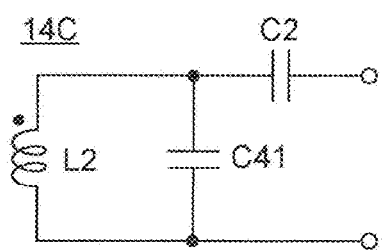
FIG. 11D is a circuit diagram illustrating a configuration example of an LC resonance circuit 14C according to a modified embodiment 8.
Figure 11E:
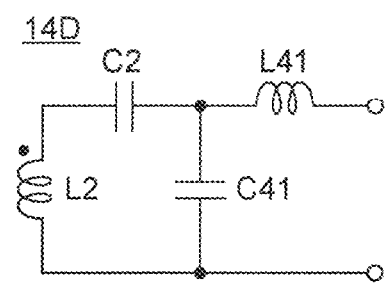
FIG. 11E is a circuit diagram illustrating a configuration example of an LC resonance circuit 14D according to a modified embodiment 9.

FIG. 11D is a circuit diagram illustrating a configuration example of the LC resonance circuit 14C according to a modified embodiment 8. Referring to FIG. 11D, the LC resonance circuit 14C includes a series circuit of the capacitor C2, and a parallel circuit of the inductor L2 and the capacitor C41, FIG. 11E is a circuit diagram illustrating a configuration example of the LC resonance circuit 14D according to a modified embodiment 9. Referring to FIG. 11E, the LC resonance circuit 14D includes an inductor L41 connected in series to a parallel circuit of the capacitor C41, and a series circuit of the inductor L2 and the capacitor C2.

Figure 11F:
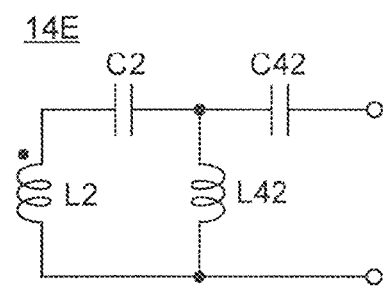
FIG. 11F is a circuit diagram illustrating a configuration example of an LC resonance circuit 14E according to a modified embodiment 10.
Figure 12:
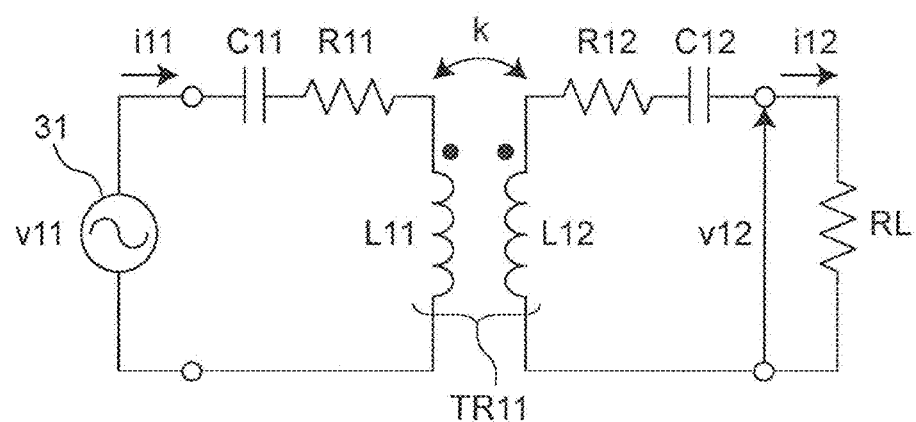
FIG. 12 is a circuit diagram illustrating a circuit example of a non-contact power transfer system using a resonance-type power converter circuit according to the prior art.
Figure 13:
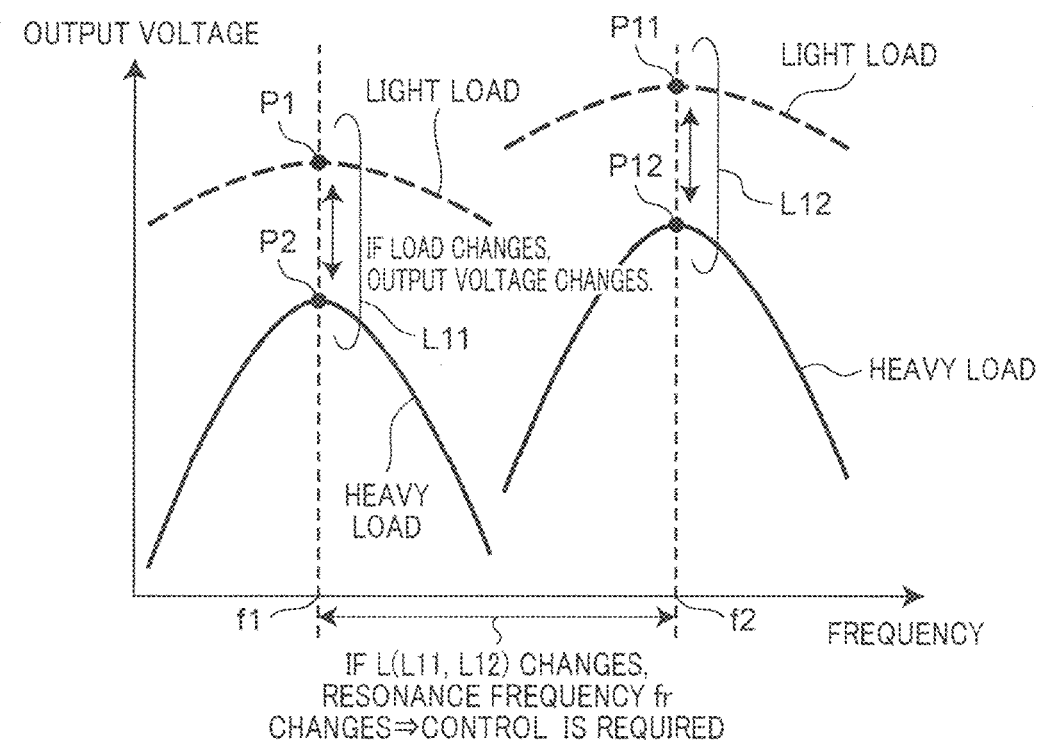
FIG. 13 is a graph illustrating an operation example of the resonance-type power converter circuit of FIG. 12.

FIG. 11F is a circuit diagram illustrating a configuration example of the LC resonance circuit 14E according to a modified embodiment 10. Referring to FIG. 11F, the LC resonance circuit 14E includes a capacitor C42 connected to a parallel circuit of an inductor L42, and a series circuit of the inductor L2 and the capacitor C2.

As is apparent from FIGS. 11A to 11F, each of the LC resonance circuit 14, and 14A to 14E may include at least one inductor and at least one capacitor, and respective inductors and respective capacitors may be connected in series or in parallel, respectively.

In the above embodiment, the maximum value of the output voltage Vo of the resonance circuit 1 is obtained using the hill climbing method, and the operating frequency corresponding thereto is determined. However, the present invention is not limited thereto, and for example, the maximum value of the output voltage Vo of the resonance circuit 1 may be obtained using other maximum value search methods such as a best priority search method, an optimized search method, a steepest descent method, and a conjugate gradient method, and the operating frequency corresponding thereto may be determined.

In the above embodiment, the MOS transistor Q1 is used as the switching element, but the present invention is not limited thereto, and a switching element such as a bipolar transistor may be used.

In the above embodiment, the detector circuit 2 detects the output voltage of the resonance circuit 1 and outputs the output voltage to the calculation controller 3, but the present invention is not limited thereto, and the output information on, for example, the output current of the resonance circuit 1 may be detected and output to the calculation controller 3, and the calculation controller 3 may perform control so as to determine the operating frequency of the resonance-type power converter circuit including the resonance circuit 1 based on the output information.

INDUSTRIAL APPLICABILITY

As mentioned above in details, with the above configuration, the present invention provides the resonance-type power converter circuit capable of solving the above two problems, and significantly reducing the calculation cost as compared with the prior art, and the non-contact power transfer system using the resonance-type power converter circuit.

The invention claimed is:

1. A resonance-type power converter circuit comprising:
a resonance circuit including a first LC resonance circuit and a switching element, the resonance circuit outputting an output voltage or an output current to a load;
a detector circuit configured to detect output information which is information on the output voltage or the output current;
a calculation controller configured to search for a maximum point or a desired voltage in a characteristic of the output information at an operating frequency using a predetermined maximum point search method based on the detected output information, and determine an operating frequency corresponding to the searched maximum point or desired voltage; and
a signal generator configured to generate a drive control signal having the determined operating frequency, and control the operating frequency on the switching element based on the drive control signal,
wherein the resonance circuit has a characteristic of output information at the operating frequency having a load independent point that does not depend on the load and corresponds to the maximum point or the desired voltage, and
wherein the resonance circuit is configured to feed back a drive control signal including the output information to the switching element and drive the switching element at the load independent point by controlling the operating frequency using the drive control signal.

2. The resonance-type power converter circuit as claimed in claim 1,
wherein the maximum point search method is a hill climbing method.

3. The resonance-type power converter circuit as claimed in claim 1,
wherein the signal generator is configured to control switching of the switching element based on the drive control signal of PWM signal, to control the operating frequency of the switching element.

4. The resonance-type power converter circuit as claimed in claim 3,
wherein the drive control signal is a binary signal for turning on or off the switching element.

5. A non-contact power transfer system comprising:
a power transmission apparatus including the resonance-type power converter circuit; and
a power receiving apparatus,
wherein the resonance-type power converter circuit comprises:
a resonance circuit including a first LC resonance circuit and a switching element, the resonance circuit outputting an output voltage or an output current to a load;
a detector circuit configured to detect output information which is information on the output voltage or the output current;
a calculation controller configured to search for a maximum point or a desired voltage in a characteristic of the output information at an operating frequency using a predetermined maximum point search method based on the detected output information, and determine an operating frequency corresponding to the searched maximum point or desired voltage; and
a signal generator configured to generate a drive control signal having the determined operating frequency, and control the operating frequency on the switching element based on the drive control signal, wherein the resonance circuit has a characteristic of output information at the operating frequency having a load independent point that does not depend on the load and corresponds to the maximum point or the desired voltage, wherein the resonance circuit is configured to feed back a drive control signal including the output information to the switching element, and drive the switching element at the load independent point by controlling the operating frequency using the drive control signal, wherein the power receiving apparatus includes:

a second LC resonance circuit coupled with the first LC resonance circuit, and configured to receive AC power from the first LC resonance circuit; and a rectifying circuit configured to rectify the AC power received by the second LC resonance circuit into DC power and output the DC power to a predetermined load.

6. The non-contact power transfer system as claimed in claim 5, wherein the power transmission apparatus further comprises:

an inverter circuit provided at a preceding stage of the first LC resonance circuit and configured to convert a predetermined DC voltage into an AC voltage and output the AC voltage to the first LC resonance circuit.

7. The non-contact power transfer system as claimed in claim 6, wherein the power receiving apparatus further comprises:

a power receiving controller configured to detect output information of the power receiving apparatus, and wirelessly transmit the output information, wherein the power transmission apparatus further comprises:

a power factor correction circuit provided at a preceding stage of the first LC resonance circuit, and configured to correct a power factor by shaping a waveform of an input current based on a predetermined AC voltage; and a power factor improving circuit controller configured to wirelessly receive the wirelessly transmitted output information and control an operation of the power factor correction circuit based on the output information.

8. The non-contact power transfer system as claimed in claim 6, further comprising at least one of:

a first DC-to-DC converter inserted between the rectifying circuit and the load in the power receiving apparatus, and configured to convert an input DC voltage into a predetermined DC voltage, and a second DC-to-DC converter provided at a preceding stage of the inverter circuit in the power transmission apparatus, and configured to convert an input DC voltage into a predetermined DC voltage, and wherein the non-contact power transfer system further comprises:

a voltage controller configured to control any one of the first DC-to-DC converter and the second DC-to-DC converter so that the output voltage becomes a predetermined voltage based on an output voltage of the load when a coupling degree "k" changes between an inductor of the first LC resonance circuit and an inductor of the second LC resonance circuit.

9. The non-contact power transfer system as claimed in claim 6 wherein the power transmission apparatus further comprises:

a rectifying circuit provided at a preceding stage of the inverter circuit, and configured to rectify a predetermined AC voltage, convert the AC voltage into a DC voltage, and output the DC voltage to the inverter circuit.

\* \* \* \* \*